United States Patent [19]

Rounds et al.

[11] 4,257,038

[45] Mar. 17, 1981

[54] CODED SECURITY SYSTEM

[75] Inventors: Michael F. Rounds, Rancho Palos Verdes; Richard D. Ranney, Hermosa Beach, both of Calif.

[73] Assignee: Notifier Company, Lincoln, Nebr.

[21] Appl. No.: 16,094

[22] Filed: Feb. 28, 1979

[51] Int. Cl.[3] ....................... G08B 13/00; G08B 19/00; B60R 25/10

[52] U.S. Cl. ....................................... 340/539; 340/63; 340/528; 340/541

[58] Field of Search .................. 340/539, 63, 541, 528

[56] References Cited

U.S. PATENT DOCUMENTS

| | | | |
|---|---|---|---|
| 3,795,896 | 3/1974 | Isaacs | 340/539 |
| 3,833,895 | 9/1974 | Fecteau | 340/539 |
| 3,852,740 | 12/1974 | Haymes | 340/539 |
| 3,858,194 | 12/1974 | Jedynak et al. | 340/528 |
| 3,914,692 | 10/1975 | Seaborn, Jr. | 340/539 |
| 4,032,848 | 6/1977 | Shaughnessy | 340/539 |
| 4,110,738 | 8/1978 | Sattin | 340/539 |

*Primary Examiner*—Glen R. Swann, III

*Attorney, Agent, or Firm*—McCormick, Paulding & Huber

[57] ABSTRACT

An electronic security system has a plurality of remote sending units which transmit coded intrusion and other emergency signals to a central alarm station. The alarm station decodes the received signals and produces an appropriate warning from an alarm generator. Electronic alarm controls at the central station discriminate the intrusion signals from other emergency signals and may block or delay the intrusion signals to allow entry or exit from the protected area. Testing circuits are also included in the alarm controls to establish a test mode of operation in which sending units transmit intrusion signals, and receipt is indicated without actuating the alarm generator. During the test mode of operation, the alarm control still accepts priority alarm signals from other sending units and generates alarm warnings from the alarm generator. The alarm control also provides alarm warnings from priority alarm signals after disarming signals are received to permit authorized entry, and provides vehicle intrusion warnings unless cancelled by a second coded transmission.

21 Claims, 4 Drawing Figures

FIRE
PANIC
CANCEL
FROM 62
ENTRY DELAY
R
80
82
84
86
88
RING TIMER
OSC
OSC
94
96
FF
j
k
Q
Q̄
100
102
104
98
141
91
92
95
90

TRANSMITTER
130
LED
144
ENCODER
128
132
POWER ON DELAY
126
124
138
136
110
CANCEL
134
TIME LATCH
122
LOAD DIP DETECTOR
120
140
142
112
118
PARALLEL DOOR SWITCHES
114
116

CODED SECURITY SYSTEM

BACKGROUND OF THE INVENTION

The present invention relates to security systems and in particular is concerned with security systems which monitor a plurality of conditions including unauthorized intrusions into a protected area.

Security systems which provide coded signals from a plurality of remote sending units and decode the signals in order to produce an appropriate alarm are known in the art. In some of the prior art systems, such as disclosed in U.S. Pat. No. 2,899,674, the signals from the sending units are coded in order to identify the location from which the coded alarm signal has been sent. More recently, however, electronic security systems such as described in U.S. Pat. No. 3,833,895 are provided with transmitters that send signals coded or modulated in accordance with a particular condition that exists at a remote site. For example, a security system may include transmitters that are energized by motion detectors and perimeter switches actuated during unauthorized entry, by fire or gas detectors and other monitoring devices and by manually actuated emergency switches. When the transmitters send signals that are coded in accordance with a particular emergency condition, the central alarm station can decode the signals to determine exactly what condition exists and what action must be taken in order to counteract or address the condition.

In security systems which provide intrusion protection, it is desirable to provide a test mode of operation for determining that the intrusion sensors or switches and the associated transmitters are properly set and operative when the system is first turned on. When a test is conducted it is also desirable to disable the warning alarm generator so that personnel in the area or at remote monitoring stations are not prompted to respond to a false alarm.

Where high priority alarm signals such as those indicating fire or other emergency conditions are produced in the same security system that includes intrusion sensors, it is undesirable to permit a test mode of operation to disable a common alarm generator because the priority alarm signals would then be interrupted also. On the other hand, it is desirable to provide a testing mode of operation for the intrusion sensors even though a system may include other types of emergency sensors.

In security systems that are responsive to coded signals, it is known, for example from U.S. Pat. No. 3,795,896, to include portable sending units that can be employed from remote areas to disable the system before an authorized entry through a predetermined perimeter is to be made. But if the system includes sending units which monitor fire and other emergency conditions, the portable transmitter could disable other units that rely upon the same alarm generator.

It is accordingly a general object of the present invention to provide a security system which receives coded signals from a plurality of sensors including intrusion sensors, and which has a testing capability that does not interfere with priority alarm signals when proper functioning of the intrusion sensors is being examined. It is a further object of the invention to include in such coded security system a disarming function that does not interfere with priority alarm signals when intrusion signals are interrupted.

It is still a further object of the invention to provide a vehicle security system that allows an intrusion signal to be cancelled by an authorized person without totally disabling system responses to other sensors.

SUMMARY OF THE INVENTION

The present invention resides in a coded security system that comprises a plurality of remote sending means for transmitting coded signals indicative of predetermined conditions at remote locations in a protected area. Some of the sending means include sensors for detecting intrusions into the protected area and other of the sending units provide signals indicative of other priority conditions such as smoke, fire, gas and distress.

A central alarm station in the security system includes decoding means for receiving and decoding each of the coded signals transmitted by the remote sending units. The discrete decoded signals identify the individual conditions at the remote locations.

Indicating means such as a visual indicator or light are connected to the decoding means and respond to each of the discrete decoded signals to indicate receipt of a transmission. Alarm means at the central station also responds to the discrete coded signals and generates alarm warnings. For example, a horn, siren or other alarm generator may be actuated to apprise personnel of an emergency condition, and may also generate distinctly different alarm warnings for the various emergency conditions detected.

Selectively operable testing means at the central alarm station are connected to the decoding means for gating those decoded signals identifying intrusions to the alarm means. The alarm means is thereby enabled or disabled, and by disabling the alarm, the intrusion sensors can be tested for proper functioning without generating false alarms. The indicating means in the central station remains operative at the same time to establish that a coded signal has been received from a tested sensor and decoded.

Circuit means are interposed between the decoding means and the alarm means for transmitting decoded signals identifying other priority emergency conditions to the alarm means independently of the testing means. Thus, during any test interval the alarm means responds to the priority emergency signals from, for example, fire detectors, independently of the testing means. In the security system, therefore, it is possible to include provisions for testing the sending units associated with unauthorized intrusion without loss of alarm warnings from other sensors during the testing interval.

In another aspect of the invention a vehicle security system enables intrusion signals to be transmitted to a central alarm station when a vehicle has been entered, and enables a second signal to be transmitted to cancel the intrusion signal when an authorized individual has made the entry.

BRIEF DESCRIPTION OF THE DRAWINGS

FIG. 1_a_ is a schematic illustration showing one portion of the coded electronic security system of the present invention.

FIG. 1_b_ is a schematic illustration showing the remaining portion of the coded security system, and connects to the portion in FIG. 1_a_ along the broken dividing lines.

DESCRIPTION OF THE PREFERRED EMBODIMENT

Figure 1:
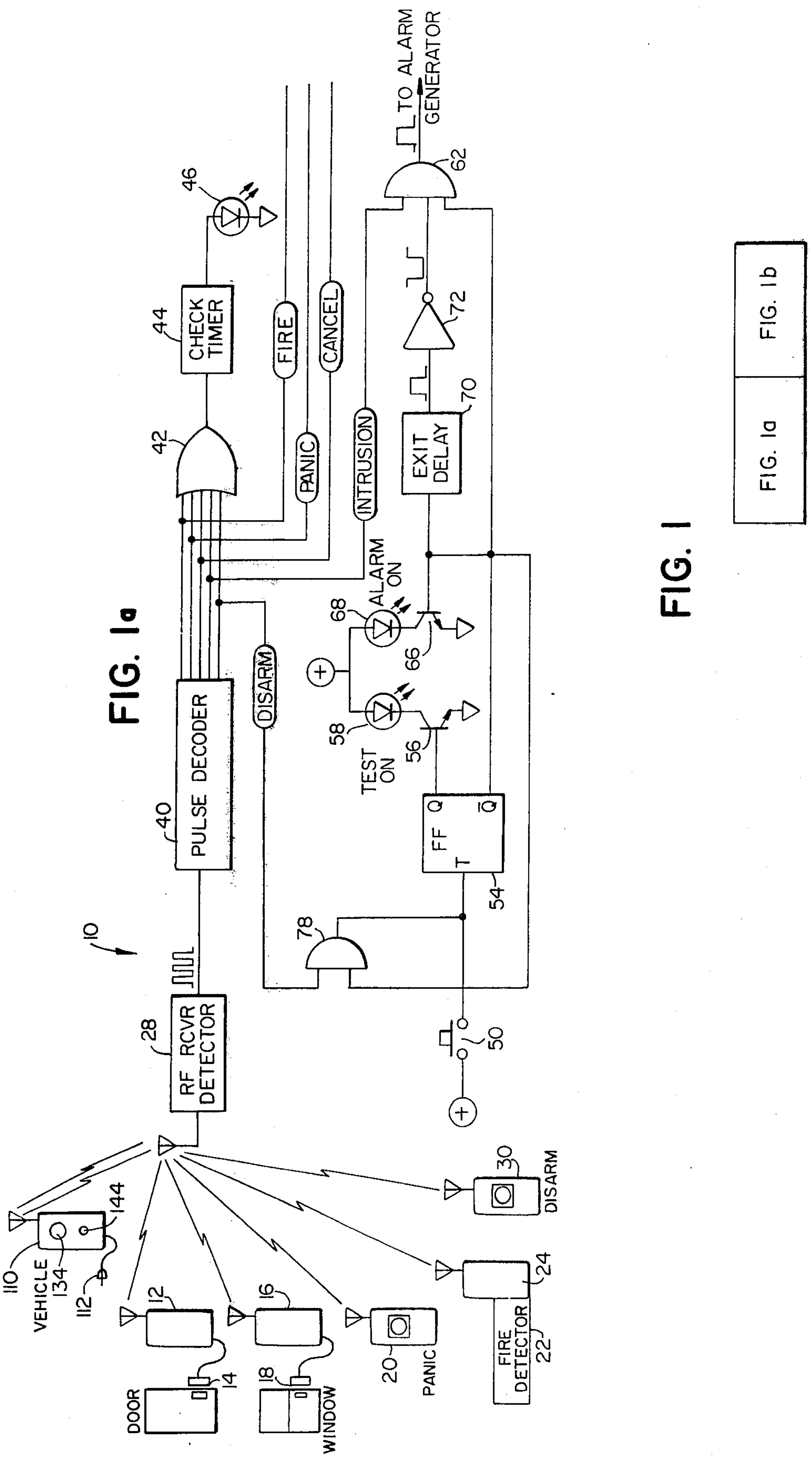
FIG. 1 is a diagram showing the relationship of FIGS. 1_a_ and 1_b_.

As shown in FIG. 1*a*, the security system, generally designated 10, of the present invention includes a plurality of remote sending units such as a door unit including a transmitter 12 and actuating perimeter switch 14, a window unit including a transmitter 16 and perimeter switch 18, a portable panic or distress transmitter 20, a fire unit having a detector 22 with an associated transmitter 24 and a vehicle monitor and transmitter 134. Each of these sending units is located at a remote station and sends a radio frequency (rf) signal to an rf receiver and detector 28 at a central alarm station whenever the transmitter associated with a particular sending unit is actuated.

For example, the perimeter switch 14 of the door unit is a two part magnetic switch that actuates the transmitter 12 whenever one part of the switch associated with the door is moved away from the other part associated with the door frame. Similarly, the perimeter switch 18 is a magnetic switch that actuates the transmitter 16 whenever a window is opened. Other such perimeter switches serving as intrusion sensors may be positioned at other entrances to a protected area to actuate associated transmitters whenever an intrusion occurs. It will also be understood that transmitters may be actuated by other types of intrusion sensors such as motion detectors and photoelectric sensors, and intrusion into a vehicle can be sensed and reported by the transmitter 130.

Other conditions such as heat or smoke can be monitored by the fire detector 22 throughout the area covered by the security system. Security personnel or occupants of the protected area may carry portable panic transmitters 20 to advise personnel at the central alarm station of distress and other emergency conditions detected by personal confrontation or observation. Still further detectors for gas and other special conditions may be provided depending upon the particular facility and circumstances that are to be monitored by the security system 10.

A portable disarming transmitter 30 may also be provided as part of the security system for transmitting an rf signal to the detector 28 at the central station in order to disable the system from responding to selected conditions detected by the sensors. For example, if authorized personnel desire to enter the protected area through one of the doors which is monitored by the transmitted 12 and switch 14, the disarming transmitter 30 may first be actuated to trigger appropriate control circuits in the central alarm station and thereby disable the system from responding to the transmitted intrusion signals.

In order to discriminate between the various signals that are received at the central station from the sending units, each transmitter produces an rf signal that is coded in a manner that is unique to the particular condition or information conveyed by the signal. For example, the transmitter 24 connected with the fire detector 22 would produce a signal having one code different from the code embodied in the signal from the panic transmitter 20. Similarly, the disarming transmitter 30 conveys a disarm signal by means of a code that is distinguishable from each of the other transmitters. In the embodiment of the invention described hereinafter, it is assumed that the transmitters 12, 16 and 134 connected to a door, window and vehicle respectively transmit signals having the same code since these signals apprise personnel at the central station of intrusions into the area or vehicle protected by the system 10.

Various forms of coding can be employed to discriminate one rf signal from another. For example, pulse coded rf signals in a pulse train may be modulated by varying the number, position or width of pulses for different alarm conditions. Encoding devices are contained in each of the transmitters and one such commercially available device which produces pulse position modulation is an integrated circuit known as an ED-11 encoder/decoder manufactured by Supertex, Inc. of Sunnyvale, Calif.

When an rf signal has been transmitted from a sending unit to the central alarm station, it is first received and demodulated by the detector 28 which develops a pulse train in accordance with the modulation imposed on the rf carrier. The pulses of the train are coded in accordance with the particular code of the transmitter which sent the rf signal, and that code is revealed by a pulse decoder 40 which receives the pulse train from the detector 28. The decoder 40 as a plurality of outputs which respectively provide decoded output signals as indicated in FIG. 1*a* for the various conditions defined by the rf signals from the transmitters. For example, one of the outputs defines a decoded disarm signal from the transmitter 30, another an intrusion signal from any of the transmitters 12, 16 or 134, another a panic signal from the transmitter 20 and still another a fire signal from the transmitter 24. An integrated circuit component suitable for carrying out the decoding function is the encoder/decoder ED-11 manufactured by Supertex and referenced above as the component employed in the transmitters to develop the pulse position coding.

Each decoded signal produced by the decoder 40 is transmitted to an OR gate 42 which actuates a check timer 44 to illuminate an indicator lamp 46. The lamp 46 may take the form of a light emitting diode (LED), and provides a visual indication for personnel at the central station that a signal of some type has been transmitted from one of the remote sending units and received at the central station. The lamp also serves as a means for checking the operation of any one of the remote transmitters and particularly the operation of the perimeter switches 14 and 18 and transmitters 12 and 16 as described in greater detail below.

TEST AND ALARM MODES

In accordance with one aspect of the present invention, means are provided for testing the intrusion signal sending units as well as the electronic equipment including the pulse decoder 40 at the central alarm station. Such means include a mode switch 50 which places the alarm controls in either a test or an alarm mode of operation. In the test mode of operation all portions of the security system described above remain operative, but the intrusion signals are prevented from triggering any alarm generator and, therefore, no false alarm warning is produced. At the same time other high priority alarm signals are unaffected and are processed to actuate the alarm generator as intended.

The mode switch 50 is biased to a normally open condition as shown, and each time the switch is pressed by personnel at the central alarm station, an electrical pulse is generated at the input of a bistable toggle flip-flop 54. Preferably the flip-flop is set in the test mode each time the alarm controls are turned on with the Q-output in the "on" or binary one-state corresponding to the test mode of operation and the $\overline{Q}$-output in the "off" or binary zero-state. In the test mode the transistor 56 is placed in a conductive state by the Q-output to energize the test lamp 58 and apprise personnel that the alarm controls are in the test mode of operation. The $\overline{Q}$-output of flip-flop 54 is connected to an AND gate 62 and in the test mode disables the AND gate through which all intrusion signals must pass from the decoder 40 to reach an alarm signal generator. Accordingly, any intrusion signals originating from the sending units at the periphery of a protected area are inhibited within the alarm controls and cannot actuate the alarm generator whenever the controls are in the test mode of operation.

Under these circumstances several checks on the intrusion portion of the security system can be made. For example, when the unit is first energized and placed in the test mode of operation, any perimeter switch 14 or 18 which has been actuated due to an open door or window transmits an intrusion signal to the detector 28, and receipt and decoding of that intrusion signal is indicated by the check lamp 46. The check timer 44 holds the lamp illuminated for a brief period of time, for example 15 seconds, sufficient to permit personnel at the alarm station to observe that a signal has been received, but no alarm warning is produced due to the disablement of gate 62. Personnel are, therefore, advised that a door or window leading into the protected area is open and must be closed in order to properly secure the area. If the check lamp is not illuminated when the system is in the test mode, one or all of the doors or windows monitored by the system may be intentionally opened, and the system, if properly functioning, will then cause the check lamp 46 to be illuminated without producing an alarm warning. Thus, in the test mode of operation the security system establishes that the system is operative and the area is secure.

When testing of the intrusion portion of the security system has been completed, the mode switch 50 is pressed to switch the system from the test mode to the alarm mode of operation. Flip-flop 54 changes state and energizes the $\overline{Q}$-output which deengerizes the test lamp 58 and illuminates the alarm lamp 68 through the conduction of transistor 66. At the same time an enabling signal is transmitted to the AND gate 62 and a triggering signal is transmitted to an exit delay timer 70.

EXIT DELAY

The exit delay timer 70 may be an integrated circuit that immediately responds to the trigger signal from flip-flop 54 and produces a delayed signal a fixed period of time thereafter, for example one minute. That delayed signal is inverted by the amplifier 72 to produce a disabling signal of like duration at one input of the AND gate 62. The remaining input of gate 62 receives all intrusion signals from the decoder 40, and thus during a brief interval following switching of the system into the alarm mode of operation none of the intrusion signals transmitted from the perimeter switches 14 and 18 is permitted to reach the alarm generator in the security system.

The purpose of the exit delay timer 70 is to allow personnel to set the system in the alarm mode of operation and exit from the protected area through a monitored door immediately thereafter without tripping the alarm and producing a false intrusion alarm signal. For example, if the security system is installed in a residence, the occupant can turn the system on, test for proper functioning of the perimeter switches in the test mode of operation, then switch the system to the alarm mode of operation and exit through one of the monitored doors as the timer 70 runs down without tripping the alarm generator. If desired, manual adjustment of the delay timer 70 may be permitted to increase or decrease the delay period provided for exit from the protected premises.

If during the alarm mode of operation an occupant wishes to test the intrusion system, the mode switch 50 may be pressed to restore flip-flop 54 and the connected circuits to the test mode of operation which also disables gate 62. If a perimeter switch is actuated no alarm will be produced by the alarm generator; however, receipt of intrusion signals from a perimeter switch can be observed by the illumination of check lamp 46. When tests are completed the mode switch is again pressed and the system reverts to the alarm mode of operation with a further delay provided by timer 70 for exiting purposes. Thus, the system may be switched back and forth between the alarm and test mode of operation at will.

INTRUSION AND DISARMING

When authorized personnel wish to enter the protected area through one of the monitored doors, several options are provided by the security system 10. One of these options includes the disarm transmitter 30 which is a portable unit similar to the panic transmitter 20 carried by authorized personnel. When actuated the transmitter 30 sends a coded disarming signal to the receiver 28, and the decoder 40 processes that signal and produces the decoded disarm signal which is transmitted to the OR gate 42 to actuate check lamp 46 and also to an AND gate 78. The AND gate 78 receives an enabling signal from the flip-flop 54 whenever the system is in the alarm mode of operation. Under these circumstances, the disarm signal is transmitted to the input of flip-flop 54 and switches the system into the test mode of operation in the same manner as the mode switch 50. When the unit is in the test mode, AND gate 78 is disabled and prevents any further disarming signals from switching the system back into the alarm mode.

At this point, any intrusion signal transmitted from a door through which authorized personnel enter is simply decoded and energizes the check lamp 46, but does not pass the AND gate 62 to energize the alarm signal generator. In other words, the disarm signal disables the alarm signal generator and latches the alarm controls in the test mode of operation. Once personnel are inside the protected area and have closed the entry door, the mode switch 50 can be pressed, if desired, and following the delay period established by timer 70, the system returns to the alarm condition that existed prior to transmission of the disarm signal.

Figures 1B, 2:
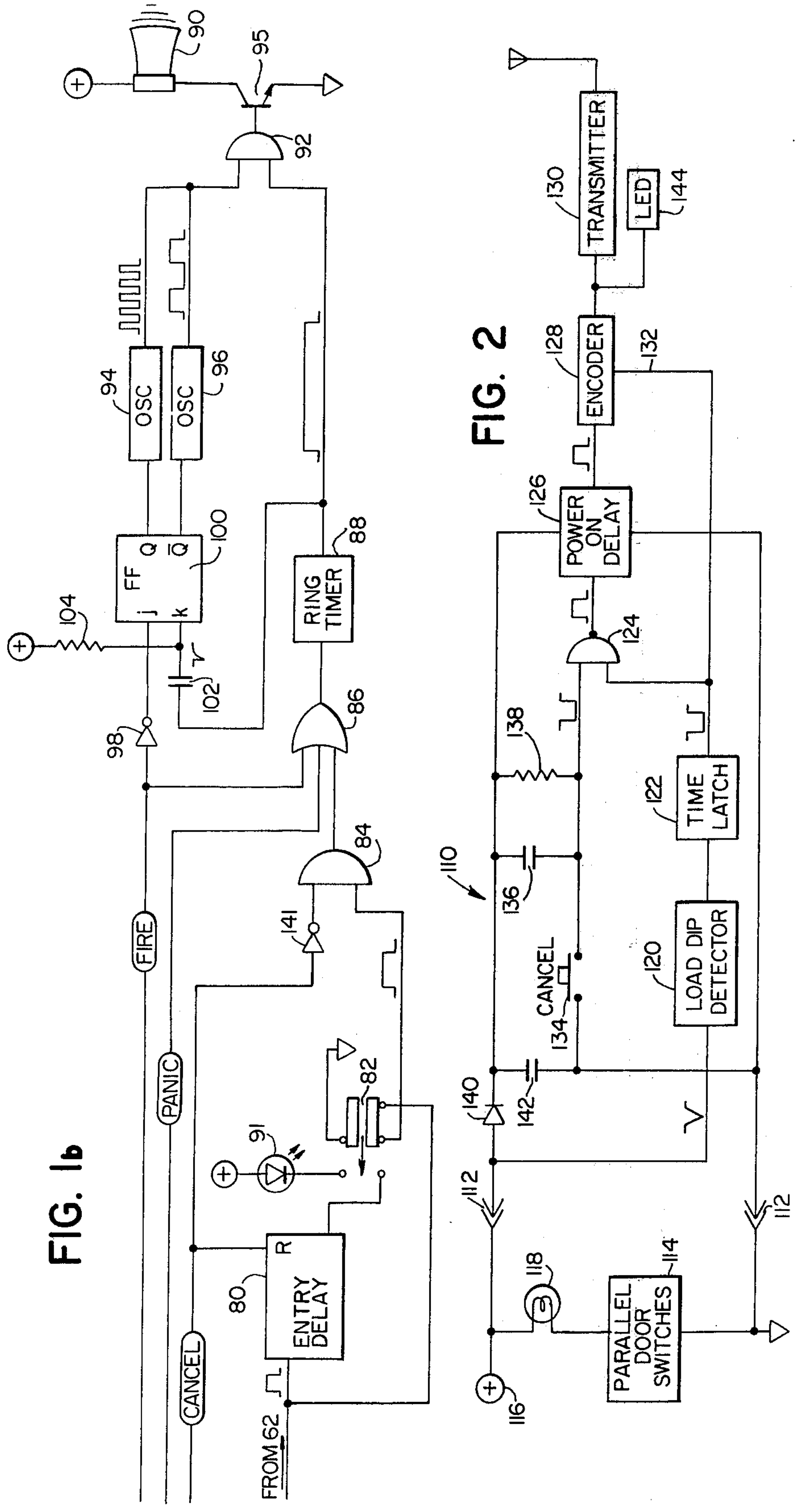
FIG. 2 is a schematic diagram of a vehicle monitor and transmitter that sends coded intrusion and cancel signals to a central alarm station.

Reference to FIG. 1*b* reveals that each of the intrusion signals relayed from AND gate 62 in FIG. 1*a* is transmitted to entry delay timer 80 and to a double-pole, double-throw entry delay switch 82. When the switch 82 is in the off or non-delay position as shown, the intrusion signal is transmitted immediately to an AND gate 84, and assumming the gate is enabled, the signal passes through the gate 84 and an OR gate 86 to a ring timer 88. When the entry delay switch is moved to the ON position as indicated by the arrow, the intrusion signal does not reach the ring timer 88 until after a predetermined delay period established by the timer 88. A lamp indicator 91 is also energized by the delay switch in the ON position to indicate that the switch is in the delay position.

The function of the delay timer is to allow personnel who, for example, may not be in possession of a disarming transmitter 30 to enter the protected premises through a monitored door and disable the intrusion alarm controls before the alarm generator is actuated. Although such a delay would also occur when an unauthorized entry had been made, the typical period of delay is on the order of 20 seconds which does not defeat the alarm system purpose.

The ring timer 88 establishes the period during which an alarm warning is produced by the alarm signal generator 90. The alarm signal generator may be a bell, buzzer, or siren but in the present case the generator is an audio speaker. A plurality of such generators may be located at different locations within and outside of the protected area. Of course, the alarm signal may be transmitted to remote stations to operate other alarm signal generators and may activate automatic telephone dialing systems to relay the alarm signal to other security centers.

When an alarm signal is received by the ring timer, the timer output is turned on for a timed period of, for example, 2 minutes. The output signal is applied to one input of an AND gate 92, and serves as a gating signal for the duration of the timed period. The other input of AND gate 92 is connected to oscillators 94 and 96, and receives an alternating signal from only one of the oscillators during any given alarm. The oscillators 94 and 96 have different characteristic frequencies as indicated by the square waves at each output in order to actuate the alarm generator 90 with distinctly different warning sounds. For example, the oscillator 94 produces a high frequency square wave that is gated by the ring timer through AND gate 92 to a power transistor 94 to excite the alarm signal generator and produce a buzzing sound. The oscillator 96, on the other hand, produces a low frequency square wave that actuates the alarm generator and produces a warbling sound. The purpose of the two oscillators is to produce distinctly different warning alarms for different alarm conditions, and the manner in which the various conditions control the oscillators is described below.

PRIORITY ALARMS

When a fire condition has been sensed by the detector 22 in FIG. 1*a* and a fire alarm signal has been sent and decoded by the pulse decoder 40, the decoded signal is applied to the OR gate 42 to momentarily illuminate the check lamp 46 and is also applied through OR gate 86 in FIG. 1*b* to the ring timer 88. At the same time, the fire alarm signal is applied to a bistable J-K flip-flop 100 through an inverter 98 to actuate oscillator 94 and deactuate oscillator 96. The J and K inputs of flip-flop 100 respond solely to negatively going input signals in order to change the state of the flip-flop, and the flip-flop is initially set by the resistor 104 and capacitor 102 with the Q-output in the off-condition and the $\overline{Q}$-output in the on-condition when power is first applied to the alarm controls. Thus the oscillator 96 is normally operative and the oscillator 94 is normally inoperative. The firm alarm signal changes the state of flip-flop 100 to deactuate oscillator 96 and actuate oscillator 94 so that the alarm signal generator 90 produces a high frequency buzzing sound whenever a fire condition has been sensed.

The fire alarm warning is produced by the alarm signal generator 90 as long as the decoded fire signal appears at the input of ring timer 88. When the decoded signal terminates, however, the ring timer runs down and the negative-going transition of the timer output signal at the end of the timing period resets the flip-flop 100 with the aid of the differentiating circuit comprised of capacitor 102 and resistor 104. Thus, at the end of each ring timer timing period flip-flop 100 is reset so that the oscillator 96 is rendered operative for intrusion and other alarms, and the oscillator 94 is turned off.

When the panic signals are sent by the transmitter 20 in FIG. 1*a*, the decoded panic signal from decoder 40 is applied to the OR gate 42 to illuminate check lamp 46 and also is applied to the OR gate 86 in FIG. 1*b* to actuate the ring timer 88. The flip-flop 100 is not affected by the panic signal and, therefore, when the AND gate 92 is enabled by the ring timer, the alarm signal generator 90 produces a low frequency warbling sound established by the oscillator 96. Customarily, a panic signal is sent only during the period in which a person holds the transmitter 20 in an actuated condition. Therefore, the alarm generator 90 is turned on only during the period in which the transmitter 20 is held actuated plus the timed period of ring timer 88. Since the system is effectively reset in its original state after the generator 90 turns off, subsequent transmission of another coded panic alarm signal from the transmitter 20 actuates the alarm generator again.

It is important to note that the alarm controls receive coded alarm signals representative of a plurality of alarm conditions but process the alarms in specific order of priority. In particular, a fire alarm signal automatically takes precedence over any other signal received by the decoder and actuates flip-flop 100 to set oscillator 94 in operation even though other alarm signals may have already triggered the ring timer 88. Furthermore, as long as the fire signal is received, the ring timer remains actuated together with oscillator 94 and the alarm signal generator 90 produces a fire alarm warning.

Second in priority are panic alarm signals. In the absence of a fire signal, a panic signal actuates the ring timer 88 and immediately produces an alarm signal even though the transmitter 30 may have previously sent a disarming signal or personnel may have left the system turned on in the test mode of operation rather than the alarm mode. The disabling of AND gate 62 by the disarming signal or the mode switch 50 has no effect on the panic alarm signal, and similarly, the exit delay timer 70 and the entry delay timer 80 will not delay the panic signal which is applied directly to the ring timer 88 through OR gate 86.

Accordingly, fire alarm signals take precedence over all other signals that may have been received by the system and receive highest priority. The panic alarm signals are given priority second only to fire alarm signals, and disarming signals render the system nonresponsive, other than the check light 46, to intrusion signals. The system, therefore, is capable of receiving a plurality of coded signals and can discriminate between those signals in order to process them in accordance with a selected order or priority.

VEHICLE ALARM

The security system 10 also includes provisions for integrating a vehicle alarm into the intrusion detection networks of the system. FIG. 1*a* illustrates a sending unit having a transmitter 110 that is installed in an automobile or other vehicle and which transmits an intrusion signal whenever an unauthorized entry has been made into the vehicle. The transmitter 110 may, for example, be actuated by connecting the transmitter through a plug 112 to the electrical system of a car, and particularly to door, hood or motion switches that would close when the vehicle is disturbed. On such occasion, the transmitter 110 sends a coded intrusion signal which is coded in precisely the same fashion as the intrusion signals sent from the transmitters 12 or 16. Consequently, the pulse decoder 40 produces a decoded intrusion signal at one of its outputs in precisely the same fashion as described above with respect to the transmitters 12 and 16. The intrusion signal from the automobile is processed through the alarm control circuits in the same manner and sounds the alarm generator 90 to apprise personnel of interference with the vehicle.

The transmitter 110 within the vehicle differs in one respect from the transmitters associated with the other security or emergency dectectors in that the transmitter can send one signal having an intrusion code and another signal having a different code representing a command to cancel an earlier intrusion signal sent to the central alarm station. The purpose of providing a cancel feature in the vehicle transmitter 110 is to permit the vehicle owner or other authorized personnel to enter the vehicle while the alarm system is operative and to inhibit the alarm thereafter.

FIG. 2 illustrates in greater detail the basic components that comprise the vehicle transmitter 110 and associated plug 112 which connects the transmitter into the vehicle electrical system. The illustrated transmitter derives its power from the vehicle battery 116 through the plug 112 which, for example, connects to the battery through a cigarette lighter in the vehicle.

In this embodiment of the transmitter, vehicle intrusions are detected by means of the momentary drop or dip battery voltage that occurs when any one of the parallel connected door switches 114 energizes the vehicle dome or entry light 118 as a door is opened. Consequently, both a triggering signal and power are derived from integral parts of the vehicle by the transmitter 110 through the plug 112. Of course, other types of triggering means such as motion sensors and specially installed door switches may be used to trigger the transmitter, and power for driving the transmitter may be provided by a separate battery installed in the transmitter for that purpose.

When a door of the vehicle is opened and the battery 116 is momentarily loaded by the dome lamp 118, a load dip detector 120 senses the momentary drop in battery voltage as indicated at the detector input, and actuates a time latch circuit 122. The latch circuit is effectively a high gain, monostable vibrator which shapes the voltage dip and produces at its output a well defined, inverted voltage pulse having a predetermined duration or width of, for example, 2 seconds. The inverted voltage pulse from the latching circuit 122 is applied to a NAND gate 124 which serves an "or" function, and the NAND gate relays the pulse in positive form through a power-on delay circuit 126 to the triggering or actuating input of a programmable, multi-code pulse encoder 128. The encoder when actuated energizes an rf transmission circuit 130 and causes a pulse-modulated rf signal to be sent to the receiver at the central alarm station.

The delay circuit 126 is operative for a brief warm-up period, for example, 30 seconds, after the plug 112 is connected to the vehicle battery 116, and inhibits any intrusion signals that would be sent during that interval. In this manner the delay circuit serves as an exit delay which allows the vehicle owner to connect the transmitter 110 into the vehicle electrical system and exit from the vehicle without generating an alarm.

The pulse encoder 128 is programmable to produce discriminatingly different signal codes, and includes at least one programming terminal 132 for setting the pulse coding generated any time the encoder is actuated by the circuit 126. Such encoders are available commercially, one of which is the Supertex ED-11 encoder/decoder mentioned above. Programming for different pulse position codes is accomplished by applying appropriate voltage levels to the programming terminal 132 from the latch circuit 122. In the presence of a sensed intrusion by the detector 120, the output of the latch circuit 122 is the inverted or low level voltage pulse, and the application of this voltage pulse to the coding terminal 132 simultaneously with the application of the actuating pulse from NAND gate 124 to the actuating input causes the encoder, to produce an intrusion code corresponding to the code developed by the window or door transmitters 12, 16. In the absence of a sensed intrusion, the output of the latch circuit is a steady high level voltage, and the application of this voltage to the coding terminal 132 sets the encoder to produce a cancel code when actuated.

A manually operated cancel switch 134 is provided in the transmitter 110 to enable the vehicle operator to transmit a cancel code when desired. The switch is connected with a capacitor 136 and a resistor 138 which form a shaping circuit that produces an inverted voltage pulse, similar to the pulse generated by the latch circuit 122, whenever the switch 134 is momentarily pressed. A diode 140 isolates the switch portion of the transmitter circuit including the capacitor 142 from the load dip detector 120, and the capacitor 142 isolates from the detector 120 transients such as the load dip created when the cancel switch 134 closes to charge capacitor 136.

When the cancel switch 134 has been pressed, the inverted voltage pulse is righted by NAND gate 124 and actuates the encoder 128. The coding terminal 132 of the encoder at this time is held at a high level voltage by the output of the latch circuit 122, and consequently the encoder when actuated causes the transmission circuit to send a coded cancel signal to the central alarm station.

Accordingly, when an intrusion is sensed by the detector 120, a low level signal is applied to the coding terminal 132 of the encoder 128, and the encoder modulates the rf transmission circuit 128 to send a coded intrusion signal to the central alarm station. When the voltage signal on the coding terminal 132 corresponds to a cancel code, and a cancel signal is commanded from the cancel switch 134, the transmission circuit sends a coded cancel signal to the central alarm station. As described below, the purpose of the cancel signal is to allow authorized personnel to enter the vehicle while the transmitter 110 is activated and trigger an intrusion signal without generating an alarm at the central station. An LED indicator 144 actuated by the encoder 128 enables the vehicle occupant to observe that a coded signal is being transmitted whenever the vehicle is entered or the cancel switch is actuated. The power-on delay may also include an oscillator which allows the intrusion or cancel signal to be interrupted periodically for compliance with FCC regulations.

Within the controls of the central alarm station in FIGS. 1*a* and 1*b* the intrusion signal from the vehicle transmitter 110 is processed in the same manner as any other intrusion signal from the door and window transmitters 12, 16. It is desirable that the entry delay timer 80 in FIG. 1*b* be enabled by means of the delay switch 82. This delay ensures that the vehicle operator will have sufficient time to enter the vehicle and transmit a cancel signal before the alarm generator 90 is turned on. When the coded cancel signal is received from the transmitter 110, the pulse decoder 40 in FIG. 1*a* produces a decoded cancel signal which is applied to the OR gate 42 to momentarily energize the check lamp 46. The cancel signal is also applied in FIG. 1*b* to the reset terminal of the entry delay timer and to an inverter 140 which disables the AND gate 84. If the resetting of the delay timer 80 is sufficient to prevent the processing of the delayed intrusion signal beyond the timer, then the gate 84 and inverter 140 are not essential to the system; however, where the timer can be by-passed by the switch 82, or if the timer is a free running timer after it is tripped, or if the negative-going transition of the timer output actually represents the delayed intrusion signal, the disabled gate 84 inhibits such intrusion signal before it reaches the ring timer 88.

It is recognized that a vehicle operator can avoid sounding an alarm signal from the central station simply by deenergizing the system before he leaves the station for his vehicle. However, it will be readily appreciated that all of the other security devices associated with the system would be rendered inoperative under these circumstances. Accordingly, the vehicle transmitter 110 with cancel code provisions offers the unique ability to allow the system to remain operative while the vehicle transmitter is sensitive to intrusions, and permits the operator to enter the vehicle without energizing the alarm generator.

In summary, the coded electronic security system described above permits a plurality of remote sending units sensing various emergency conditions to communicate with the central alarm station where the various signals are decoded and processed in accordance with the predetermined priority. The test system at the central alarm station allows intrusion sensors to be examined for proper functioning whenever the system is turned on and at any time thereafter without interfering with higher priority alarms that may, for example, come from sending units detecting fire or panic conditions. Also, the higher priority alarms are not affected if authorized personnel wish to enter the protected area through a monitored gate and disable the intrusion portion of the system wih a coded disarming signal from transmitter 30. Similarly, the high priority fire or panic signals are not affected by coded signals which cancel the intrusion signals relayed from the vehicle transmitter 110.

While the present invention has been described in a preferred embodiment, it should be understood that numerous modifications and substitutions can be had without departing from the spirit of the invention. For example, the various timing and gating circuits described have been shown in schematic form and numerous analog and digital components and circuits may be employed in actual practice to perform the indicated logic. Also, the digital signal levels represented at various points within the control circuits are a matter of choice and can be varied in accordance with the requirements of the actual circuitry utilized. On a broader scale, it is not essential to employ only those condition sensors shown or described nor is it essential to include all of the sensors illustrated. While the various sending units have been described as including rf transmitters it should be appreciated that other types of transmitters may be employed in both wireless and wired systems. Accordingly, the present invention has been described in a preferred embodiment by way of illustration rather than limitation.

We claim:

1. A coded security system comprising:

a plurality of remote sending means for transmitting coded signals indicative of predetermined conditions at remote locations of a protected area, some of the sending means including sensors for detecting intrusions into the protected area and other of the sending means providing signals indicative of priority emergency conditions;

a central alarm station;

decoding means for receiving and decoding each of the coded signals at the central alarm station and providing discrete decoded signals identifying the individual predetermined conditions indicated by the coded signals transmitted from the remote sending means;

indicating means connected to the decoding means and responsive to each of the discrete signals provided by the decoding means to indicate receipt of a coded signal by the decoding means;

alarm means at the alarm station for generating an alarm signal in response to the discrete decoded signals provided by the decoding means;

selectively operable testing means at the central alarm station connected to the decoding means for gating the discrete decoded signals identifying intrusions to the alarm means from the decoding means, thereby enabling or disabling the alarm means to respond to the intrusion signals; and circuit means interposed between the decoding means and the alarm means for transmitting the decoded signals identifying priority emergency conditions to the alarm means independently of the testing means whereby the alarm means responds to the priority emergency conditions independently of the testing means and responds the intrusion conditions through the testing means.

2. A coded security system as defined in claim 1 wherein the plurality of remote sending means comprise electronic transmitters sending pulse coded signals unique to a predetermined condition; and the decoding means comprises a pulse signal decoder.

3. A coded security system as defined in claim 1 wherein:

the plurality of sending means include sending means for transmitting a coded disarming signal to the decoding means at the central alarm station;

the decoding means provides a discrete, decoded disarming signal in response to a coded disarming signal; and the testing means is operatively responsive to the decoded disarming signal to disable the alarm means from subsequently received intrusion signals.

4. A coded security system as defined in claim 3 wherein the selectively operable testing means is also manually engagable to disable the alarm means from responding to subsequently received intrusion signals.

5. A coded security system as defined in claim 1 wherein the sending means comprise rf transmitters and the decoding means comprises an rf receiver.

6. A coded security system as defined in claim 1 wherein entry delay means is included in the central alarm station and is interposed between the selectively operable testing means and the alarm means to disable the alarm means from responding to decoded intrusion signals for a given period of time after the decoded intrusion signal is gated to the alarm means by the testing means.

7. A coded security system as defined in claim 1 wherein:

the selectively operable testing means is settable between a gated condition in which decoded intrusion signals are gated to the alarm means and an ungated condition in which intrusion signals are disabled from reaching the alarm means;

exit delay means is included in the central alarm station for delaying for a given period of time after actuation of the delay means responses of the alarm means to decoded intrusion signals; and means are provided for actuating the exit delay means and simultaneously setting the testing means in the gated condition whereby the alarm means cannot respond to an intrusion signal for given period after setting the testing means in the gated condition.

8. A coded electronic security system comprising:

an alarm control station having an alarm signal generator;

first signal sending means for transmitting coded intrusion signals to the alarm control station in response to a sensed intrusion;

second signal sending means for transmitting coded priority alarm signals to the alarm control station, the code of the priority alarm signals being discriminatingly different from the code of the intrusion signals;

electronic decoding means at the alarm control station for receiving the coded signals transmitted by the first and second sending means and for discriminating one coded signal from another and producing decoded intrusion alarm signals and decoded priority alarm signals;

visual indicating means connected to the decoding means and responsive to each decoded alarm signal to provide a visual indication that an alarm signal has been received;

alarm control means at the alarm control station for actuating the alarm generator including a gating circuit receiving the decoded intrusion sgnals and having a controlled gate selectively actuated to block the intrusion signals or pass the intrusion circuit connected to the alarm generator to actuate the alarm generator in response to a decoded alarm signal, the actuating circuit being connected to the gating circuit to receive the decoded intrusion signal through the controlled gate and being connected to the decoding means to receive the decoded priority alarm signals independently of the gating circuit; and selectively operable means at the alarm control station connected to the controlled gate of the gating circuit blocking or passing the decoded intrusion alarm signal for actuating the controlled gate into the blocking condition while proper functioning of the first signal sending means is being tested, whereby the alarm generator is actuated by the priority alarm signals when decoded regardless of testing and by the intrusion alarm signals when decoded except during testing.

9. A coded electronic security system as defined in claim 8 further including;

third signal sending means for transmitting coded disarming signals to the alarm control station and wherein:

the electronic decoding means receives the coded disarm signals and produces a decoded disarm signal; and disarming means are provided in the alarm control station responsive to the decoded disarm signal and connected in controlling relationship to the controlled gate in the gating circuit for causing the gate to block the intrusion signals.

10. A coded electronic security system as defined in claim 9 wherein:

the disarming means includes means for latching the controlled gate in a blocking condition to intrusion alarm signals; and the selectively operable testing means includes mode selecting means for resetting the controlled gate from the latched, blocking condition to the passing condition.

11. A coded electronic security system as defined in claim 8 wherein the second signal sending means includes a fire detector and a transmitter producing a coded fire alarm signal in response to a fire sensed by the detector.

12. A coded electronic security system as defined in claim 8 wherein the second, signal sending means includes a portable panic alarm transmitter producing a coded panic alarm.

13. A coded electronic security system as defined in claim 8 wherein the first and second signal sending means comprise radio frequency transmitters and the electronic decoding means includes a radio frequency detector.

14. A protective security system comprising:

first coded transmitting means operable to transmit signals having a first of three signal codes and operable to transmit other signals having a second of the three signal codes;

sensing means connecting to a vehicle for detecting an unauthorized intrusion into the vehicle, and connected to the first coded transmitting means to transmit an intrusion signal in the first of the three signal codes;

manually operable actuating means also connected to the first coded transmitting means to selectively transmit a signal in the second of the three signal codes;

second coded transmitting means operable to transmit priority alarm signals having a third of the three signal codes in the event of a priority alarm condition;

receiver means for receiving the transmitted signals in each of the three signal codes and including decoding means producing a decoded intrusion signal in response to an intrusion signal transmitted in the first of the two signal codes, a decoded cancel signal in response to a signal transmitted in the second of the two signal codes and a decoded priority alarm signal in response to a signal transmitted in the third of the three signal codes;

alarm signal generating means for producing an alarm signal in response to an energizing signal;

time delay means connected to the decoding means to receive a decoded intrusion signal and produce an energizing signal for the alarm signal generating means a predetermined delay period thereafter;

inhibiting means operatively associated with the alarm signal generating means and the time delay means and connected to the decoding means to receive a cancel signal for inhibiting the energizing signal for the alarm signal generating means when a cancel signal is received; and priority alarm means connected to the decoding means to receive a decoded priority alarm signal and produce an energizing signal for the alarm signal generating means independently of the time delay means and immediately upon receipt of a decoded priority alarm signal.

15. A protective security system as defined in claim 14 further including:

perimeter sensing means connected with an entrance to a protected security area for detecting unauthorized entry into the area; and third coded transmitting means connected with the perimeter sensing means for transmitting a coded intrusion signal having the first of the three signal codes in response to a sensed intrusion into the protected security area.

16. A protective security system as defined in claim 15 wherein the time delay means is selectively operative to receive a decoded intrusion signal and produce an energizing signal for the alarm signal generating means with and without delay.

17. A vehicle security system comprising:

a central alarm control station having an alarm generator for producing a perceptible warning alarm in response to alarm signals received from remote stations;

first means operatively associated with a protected vehicle for transmitting an intrusion signal to the central alarm station in response to a sensed intrusion of the vehicle;

second means for transmitting a cancel signal from the protected vehicle to the central alarm station, the cancel signal and the intrusion signal being discrete signals manifested by discriminatingly different signal characteristics;

third means located at stations remote from the central alarm station for transmitting priority signals indicative of other alarm conditions and having signal characteristics discriminatingly different from the intrusion and cancel signals from the first and second transmitting means;

receiver means at the central station for receiving from remote stations a plurality of signals having discriminatingly different characteristics including intrusion, priority alarm and cancel signals, and for producing discrete signals within the central station for each of the signals received from the remote transmitting means;

alarm signal generating means at the control station connected with the receiver means and the alarm generator for energizing the generator in response to discrete intrusion signals;

inhibiting means at the central alarm station connected with the receiver means for disabling the alarm signal generating means from responding to the discrete intrusion signals in response to discrete cancel signals; and the alarm signal generating means also being responsive to the priority alarm signals to energize the alarm generator independently of the inhibiting means whereby the alarm generator provides a warning alarm in response to priority alarm signals regardless of transmitted cancel signals received at the central alarm control station.

18. A vehicle security system as defined in claim 17 wherein:

the first and second means for transmitting comprise a common encoder having programmable coding terminals for establishing discriminatingly different signal codes and programming means connected to the terminals for setting one code for intrusion signals and another code for cancel signals.

19. A vehicle security system as defined in claim 18 wherein:

the first means for transmitting further includes an intrusion detector connected to the vehicle and the programming means for transmitting coded intrusion signals; and the second means for transmitting further includes manually actuated means connected to the programming means for transmitting coded cancel signals.

20. A vehicle security system as defined in claim 17 further including delay means between the receiver means and the alarm signal generating means for delaying the response of the generating means to discrete intrusion signals thereby permitting the cancel signal to disable the alarm signal generating means before a perceptible warning alarm is produced.

21. A vehicle security system as defined in claim 20 wherein:

the delay means at the central alarm station includes resettable timing means; and the inhibiting means is also connected to the resettable timing means for resetting in response to cancel signals.

* * * * *